United States Patent [19]

Ernst et al.

[11] Patent Number: 5,391,212
[45] Date of Patent: Feb. 21, 1995

[54] FILTER SYSTEM, ESPECIALLY FOR FILTERING THE AIR INTAKE OF AN INTERNAL COMBUSTION ENGINE

[75] Inventors: Volker Ernst, Sachsenheim; Arthur Klotz, Remseck; Rudolf Leipelt, Marbach, all of Germany

[73] Assignee: Filterwerk Mann & Hummel GmbH, Ludwigsburg, Germany

[21] Appl. No.: 70,986

[22] Filed: Jun. 4, 1993

[30] Foreign Application Priority Data

Jun. 4, 1992 [DE] Germany ............... 4218396

[51] Int. Cl.$^6$ ............................................. B01D 35/30
[52] U.S. Cl. ..................... 55/385.3; 55/488; 55/497; 55/502; 123/198 E
[58] Field of Search .............. 55/488, 502, 385.3, 55/497, 342, 350.1, 501, 511, DIG. 28; 123/198 E

[56] References Cited

U.S. PATENT DOCUMENTS

| | | | |
|---|---|---|---|
| 4,006,000 | 2/1977 | Tortorici et al. | 55/502 X |
| 4,135,899 | 1/1979 | Gauer | 55/502 X |
| 4,639,261 | 1/1987 | Pittman et al. | 55/502 |
| 4,865,637 | 9/1989 | Gruber | 55/502 X |
| 4,925,468 | 5/1990 | Kishi et al. | 55/467 |
| 4,929,263 | 5/1990 | Kasugai | 55/502 |
| 5,120,334 | 6/1992 | Cooper | 55/385.3 |
| 5,137,557 | 8/1992 | Behrendt et al. | 55/502 X |

FOREIGN PATENT DOCUMENTS

88/03833 6/1988 WIPO .

*Primary Examiner*—Richard L. Chiesa
*Attorney, Agent, or Firm*—Evenson, McKeown, Edwards & Lenahan

[57] ABSTRACT

A filter system for filtering the air intake of an internal combustion engine including a housing having a bottom half and a cover half, at least two filter inserts each consisting of pleated filter paper or filter batting, and a circumferential gasket. The two filter inserts are connected by a junction strip which simultaneously seals the raw air chamber from the clean air chamber between the two filter inserts.

9 Claims, 4 Drawing Sheets

FILTER SYSTEM, ESPECIALLY FOR FILTERING THE AIR INTAKE OF AN INTERNAL COMBUSTION ENGINE

BACKGROUND OF THE INVENTION

This invention relates to a filter system, especially for filtering the air intake of an internal combustion engine.

Kishi et al., U.S. Pat. No. 4,925,468 discloses a filter system consisting of a filter with a plurality of filter elements, each of which has at least one connecting surface parallel to the direction of the air flow, so that the filter elements are movable relative to one another. The filter system described therein is designed for installation in an air conditioning system and filters foreign substances from the air flowing through the air duct.

In filter systems used in motor vehicles it must be assured that no unfiltered leakage air passes between the filter insert and the housing. It is especially important that a tight seal be provided in a filter for the air intake of an internal combustion engine. Leaks in the filter system result in dust and dirt particles being sucked into the engine which may lead to the destruction of the engine.

Prior art filters which have a plurality of filter elements do not assure a secure seal between the raw air side and the clean air side of the filter.

SUMMARY OF THE INVENTION

It is the object of the invention to provide an improved filter system which uses at least two filter elements.

It is also an object of the invention to provide a filter system which assures a reliable seal between the raw air side and the clean air side of the filter.

A further object of the invention is to provide a filter system which is particularly adapted for use in the air intake of an internal combustion engine.

Another object of the invention is to provide a filter system which is easy and economical to manufacture.

These and other objects of the invention are achieved by providing a filter arrangement comprising a housing comprising a housing bottom and a housing cover; a first filter insert disposed in the housing and comprising a pleated filter paper or filter batting and having a gasket extending at least partially around an outer margin thereof; a second filter insert disposed in the housing with one side adjacent a parallel side of the first filter insert, the second filter insert comprising a pleated filter paper or filter batting and having a gasket extending at least partially around a circumferential margin thereof; and a junction strip joining the adjacent parallel sides of the first and second filter inserts and sealing a raw air chamber on one side of the filter inserts from a clean air chamber on an opposite side of the filter inserts.

An important advantage of the invention lies in the ease of the manufacture of the filter inserts. Thus, filter inserts up to a certain width can be produced on a conventional folding machine. Filter systems, especially for use in trucks or heavy machinery, require a very large filter area, which can be achieved only by increasing the width of the filter insert. In the past it has been necessary to use special machines to manufacture such a filter insert, and consequently it has been uneconomical. Through the use of filter inserts with a standardized width the cost of production can be considerably reduced, but an effective sealing of the entire filter system must be provided. Due to the junction strip running between the filter inserts, which is integrated into the gasket at its extremities, a reliably working filter system of this kind can be manufactured.

The junction strip and gasket can be manufactured in a single operation and from the same material, thereby permitting an additional cost reduction.

In accordance with one preferred embodiment of the invention, the upper part of the housing is supported on the bottom part thereof in the area of the center of the filter system. Such a support serves to prevent the upper part of the housing from vibrating due to pulsation of the intake air and lends stability to the upper part. An opening is provided in the junction strip for this support. A fastening means in the form of a staybolt disposed on the bottom part of the housing extends through this opening. A counterpiece for the fastening means is provided on the upper part of the housing. Joining the two housing parts together simultaneously seals the opening in the junction strip.

Another preferred embodiment of the invention is characterized by the fact that the surrounding gasket is given a hook-shaped cross section. The gasket may advantageously be composed of polyurethane foam or silicone foam and is disposed directly on the filter paper or filter batt. The cross section is approximately frustoconical in shape, and a groove with a matching female cross-sectional shape is provided in the housing bottom piece in which the frustoconical hook is hung. The shape of the cross section prevents the filter insert from slipping off when it is being installed.

Another embodiment of the invention is particularly advantageous where there is a filter housing which has an irregular geometry to which it is necessary to adapt the filter. In such a case it is possible to provide the individual filter inserts with different pleat widths so that the available space within the filter housing is optimally utilized.

The two housing halves are joined together by a snap fastener. In filter housings it has proved advantageous to use a toggle fastener. However, it is also possible to connect the housing parts together by means of a quarter-turn fastener or a simple threaded fastener.

Another embodiment of the invention relates to the easier handling of the filter. In this case, the junction strip is advantageously in the form of a film hinge. This makes it possible to fold the two filter inserts against one another so that they can be transported as a compact unit.

The various features of the preferred embodiments described in this specification and/or shown in the accompanying drawings may be used individually or in various combinations and/or subcombinations, all of which are intended to be protected as independently patentable parts of the present invention.

BRIEF DESCRIPTION OF THE DRAWINGS

The invention will be described in further detail hereinafter with reference to illustrative preferred embodiments shown in the accompanying drawings in which:

FIG. 1b is a partially sectional side view taken along line Ib—Ib of FIG. 1a;

DETAILED DESCRIPTION OF PREFERRED EMBODIMENTS

Figure 1A:
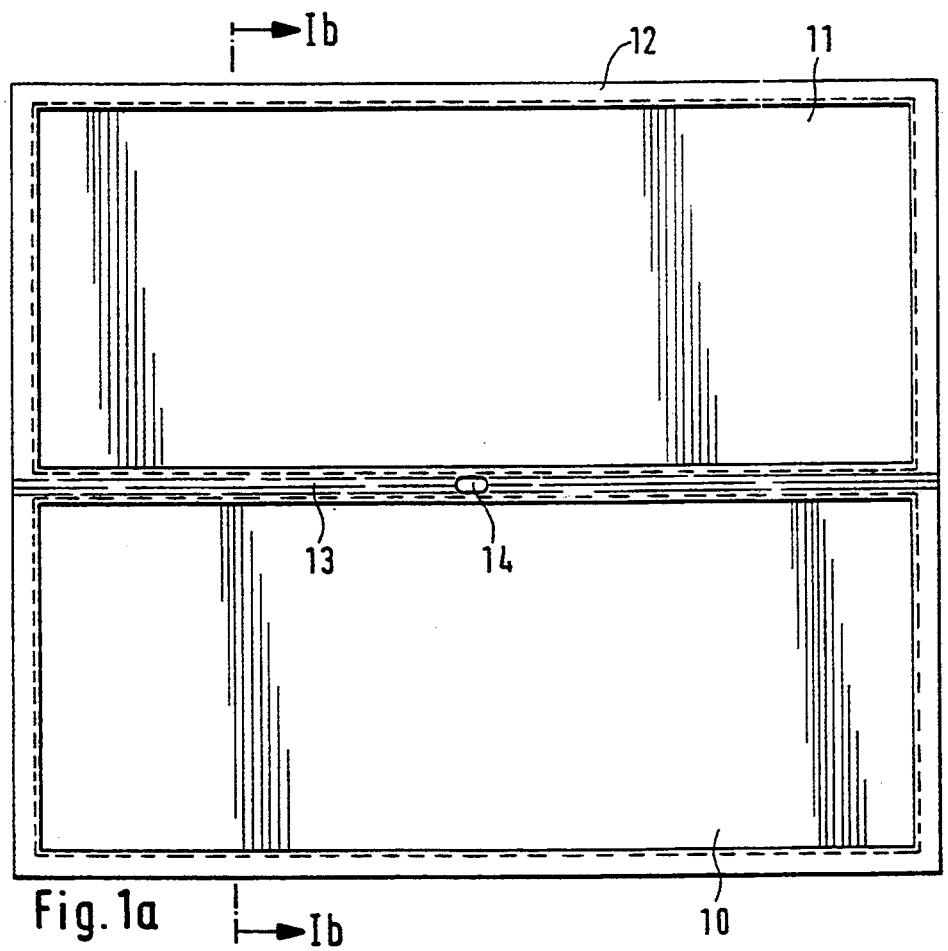
FIG. 1a is a schematic representation of a filter insert consisting of two individual filter elements.
Figure 1B:
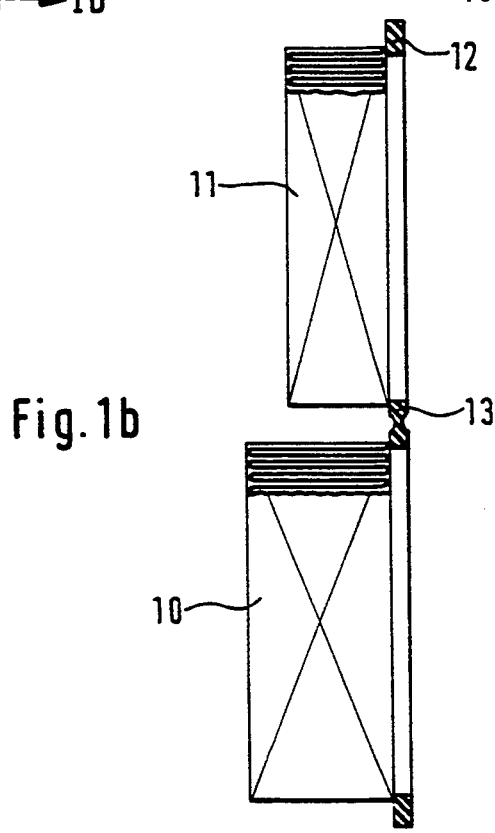

The schematic representation in FIG. 1a shows a first filter insert 10, a second filter insert 11, and a circumferential gasket 12. The two filter inserts are joined together by a junction strip 13. As the cross-section in FIG. 1b shows, the pleats in filter insert 11 are narrower than those of the filter insert 10. The possibility of using different pleat widths is advantageous wherever the available space on both sides of the filter is different so that it is necessary to adapt the filter to the available space. An opening 14 is provided in the junction strip 13; the purpose of this opening will be explained in connection with FIG. 2. The junction strip 13 may be a film hinge, thereby enabling one of the filter inserts to be folded against the other filter insert.

Figure 2A:
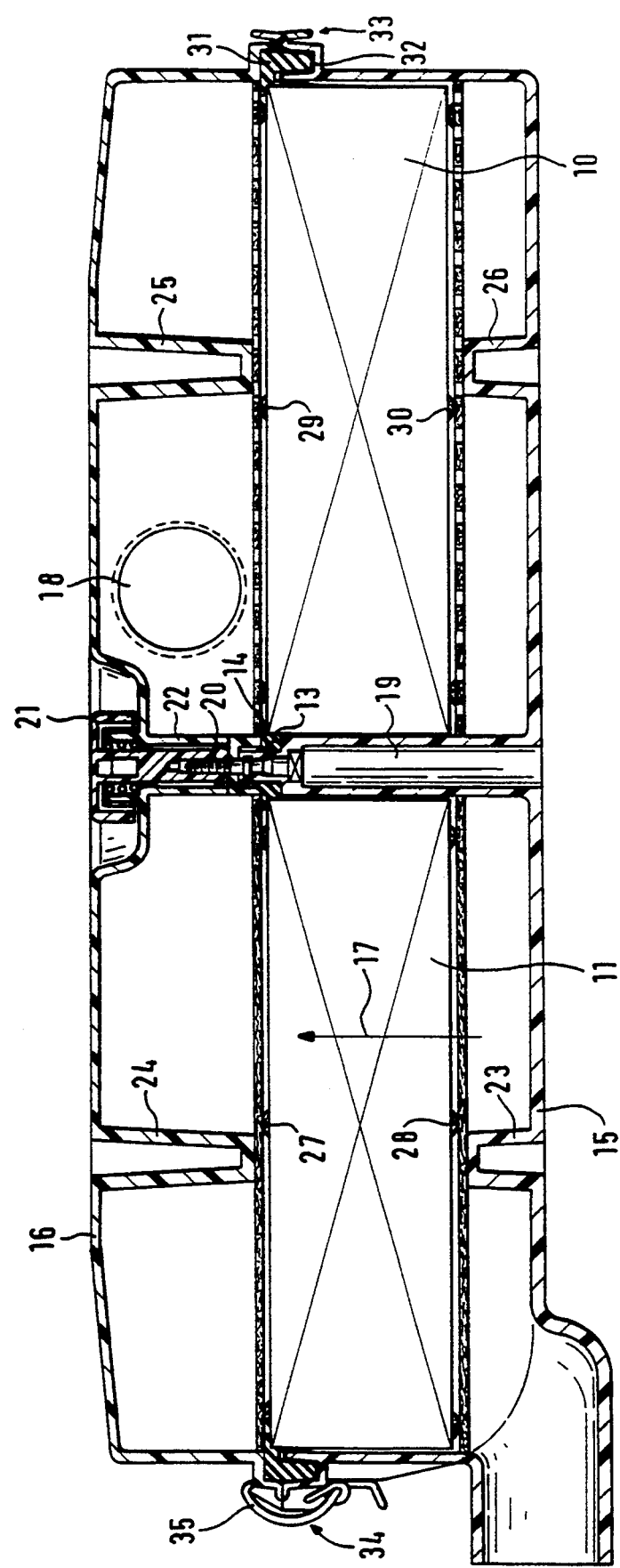
FIG. 2a is a cross-sectional view of a filter system.
Figure 2B:
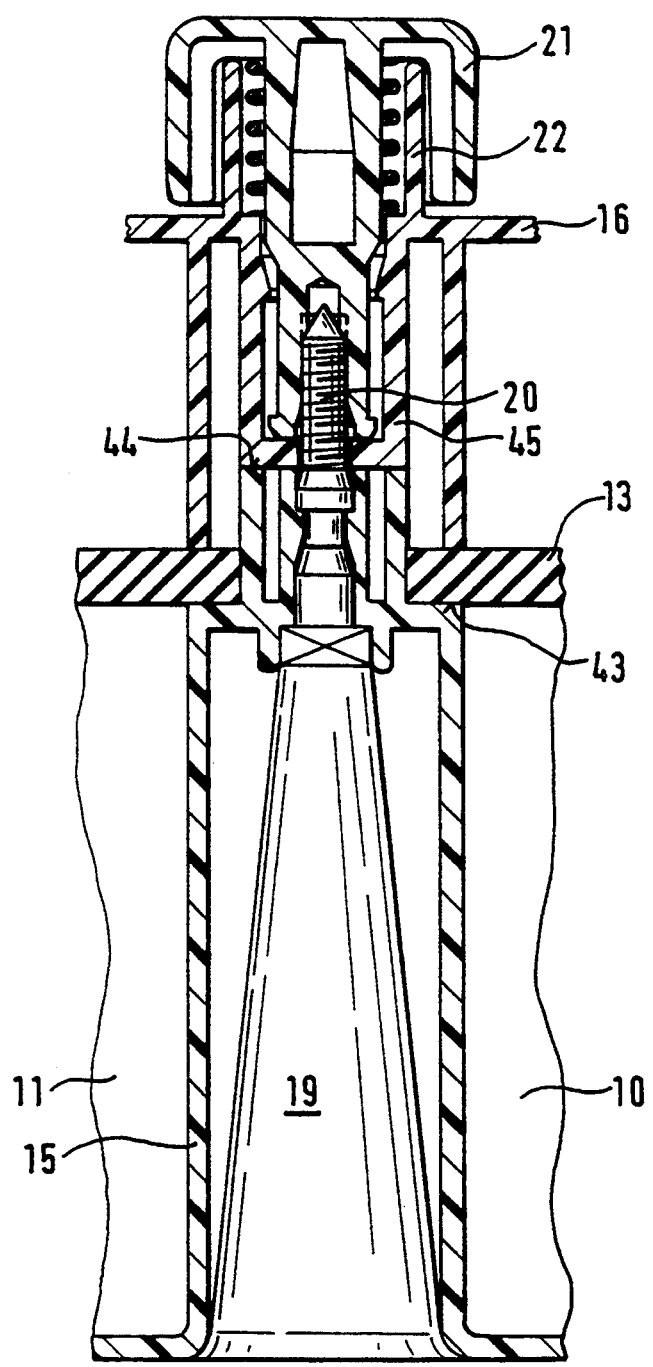
FIG. 2b is an enlarged detail view of the central portion of FIG. 2a showing the connection between the parts of the housing.

The cross section in FIG. 2a shows a filter system with a housing bottom half 15, a housing top half 16, and filter inserts 10 and 11 disposed between the housing halves. The air flows through the filter inserts as indicated by arrow 17 and passes into the intake duct of an internal combustion engine. A detail view of the central fastening between the top half 16 and bottom half 15 is shown in FIG. 2b. Between the two filter inserts 10 and 11 is a junction strip 13. To support the top half 16 of the housing on the bottom half 15, a fastening means in the form of a staybolt is disposed on the bottom half 15. This staybolt has at its upper end a screw thread 20. The staybolt furthermore comprises a first abutment surface 43 for the junction strip 13 and a second abutment surface 44. On this second abutment surface 44 lies a spacer 45 of the housing's top half 16. These abutment surfaces and the spacer establish a set spacing between the bottom and top of the housing. The connection is established by means of a manually turned nut 21 arranged in a receptacle 22 in the top half of the housing. This nut 21 engages the thread 20 of the staybolt and produces a rigid connection in the central part of the filter system.

Particularly in very large filter systems, it is advantageous to provide additional supporting means in order to avoid pulsating vibrations both of the filter inserts and of the housing. These are also shown in FIG. 2a. Both on the bottom and on the top halves of the housing, posts 23, 24, 25 and 26 are provided, which extend all the way directly to the respective filter insert.

The posts 23, 24, 25 and 26 thus stiffen the housing transversely of the folding direction of the pleats of the filter inserts 10 and 11. To fix the spacing of the pleats in these filter inserts, beads of glue 27, 28, 29 and 30 are provided. The glue beads prevent the pleats from packing, i.e. sticking together, at a high air throughput, both on the upstream side and on the raw air side. To protect the pleats of the filter inserts, a non-woven batt can be arranged over the full-surface of both sides of the filter insert. This batt is, for example, perforated on the upstream side and is held in place by the glue beads. The glue beads may extend underneath the posts and in this manner, in conjunction with the batt, any contact between the posts and the filter insert can be prevented.

The filter inserts 10 and 11 are provided with a circumferential gasket with a hook-shaped cross section 31. This gasket is hooked into a circumferential groove 32 in the bottom half of the housing. The hook shape prevents exterior air from entering into the clean air space of the housing top and also unfiltered air from the raw air chamber from entering into the clean air chamber. The junction strip 13, particularly the opening 14, also is configured in conjunction with the staybolt 19 in such a way that unfiltered air is effectively prevented from entering the clean air space.

The housing top half and bottom half are provided with catches 33, with which the two housing halves are fixed in the correct position. The precise assembly of the halves is thus considerably facilitated. The housing halves are additionally joined together by means of a toggle fastener, which is fastened to the bottom half of the housing. The hook 35 engages in an opening or recess in the housing top and securely closes the filter system under constant tension.

Figure 3:
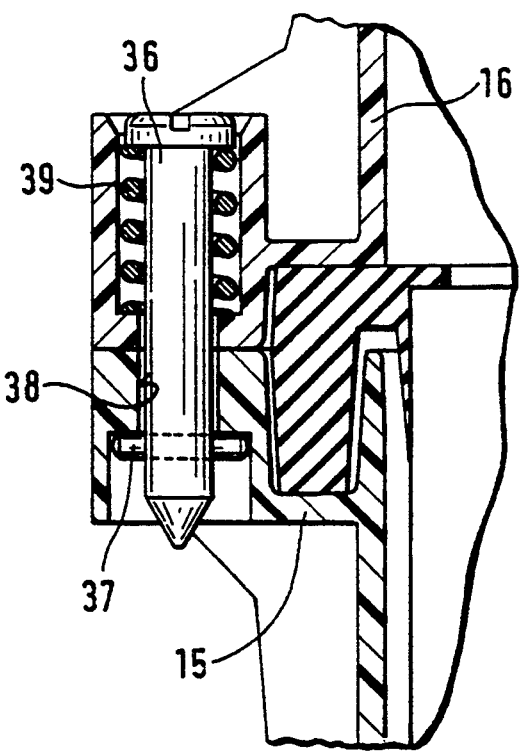
FIG. 3 is a sectional view of a fastener for a filter system.

As an alternative, a quarter-turn fastener can be used. This consists, as shown in FIG. 3, of a pin 36 provided with a cross pin 37 at its bottom end. The end provided with the cross pin 37 is fitted into a bore 38 of matching shape in the housing bottom. A quarter turn of the pin 36 locks the two housing halves together. The tension of this fastener is precisely adjustable by means of a spring 39.

Figure 4:
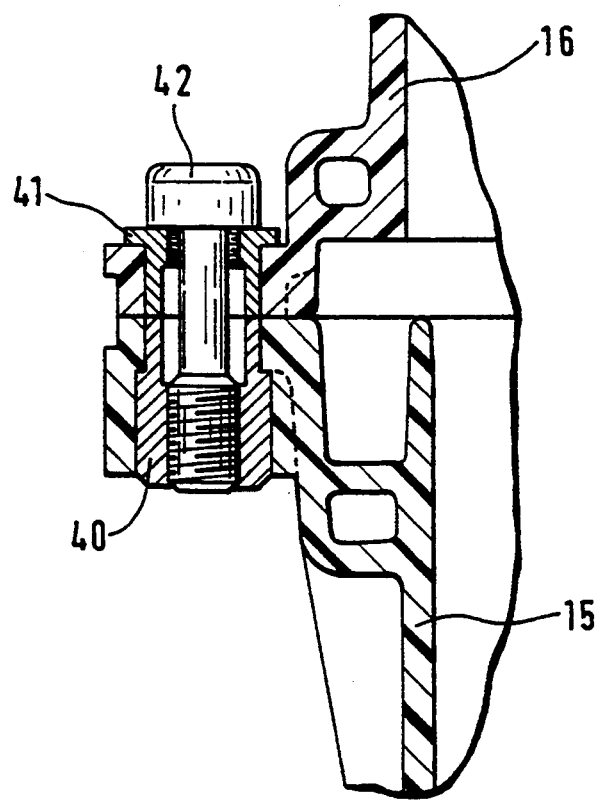
FIG. 4 is a sectional view of an alternate embodiment of a fastener for a filter system.

Another variant fastener is shown in FIG. 4. Both in the housing bottom 15 and in the top 16 there are inset metal bushings 40 and 41 set in bores aligned with one another. Each of the individual bushings is provided with a screw thread, the thread of the one bushing 40 serving to fasten an Allen screw and the thread in the other bushing 41 serving to prevent the loss of this screw. The bushings 40 and 41 provide a metal contact surface between the housing top and bottom. This kind of screw fastening avoids the disadvantage of using screws in direct contact with the plastic, which of course results in the creeping of the plastic and with it a loosening of the connection.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter arrangement comprising:
   a housing comprising a housing bottom and a housing cover;
   a first filter insert positioned in said housing and comprising a pleated filter paper or filter batting and having a gasket extending at least partially around an outer margin thereof;
   a second filter insert positioned in said housing with one side adjacent a parallel side of said first filter insert, said second filter insert comprising a pleated filter paper or filter batting through which filtered air passes and having a gasket extending at least partially around a circumferential margin thereof;
   a junction strip joining the adjacent parallel sides of said first and second filter inserts and sealing a raw air chamber on one side of said filter inserts from a clean air chamber on an opposite side of said filter inserts; and a fastener carried by said housing bottom for connecting said housing bottom to said housing cover, said fastener being aligned with an opening in said junction strip and extending through said opening to sealingly close said opening.

2. A filter arrangement according to claim 1, wherein said housing bottom is provided with a circumferential groove, and said gaskets, which extend at least partially around circumferential margins of said filter inserts, have a hooking profile which is received in said circumferential groove.

3. A filter arrangement according to claim 2, wherein said hooking profile is formed of polyurethane foam or silicone foam, which is cast directly onto said filter paper or filter batting.

4. A filter arrangement according to claim 3, wherein said hooking profile and said circumferential groove have matching tapered cross sectional configurations.

5. A filter arrangement according to claim 1, wherein said first and second filter inserts comprise said pleated filter papers which have different pleat widths.

6. A filter arrangement according to claim 1, wherein said housing bottom is connected to said housing cover by at least one said fastener selected from the group consisting of screw fasteners, quarter-turn fasteners and toggle fasteners.

7. A filter arrangement according to claim 1, wherein said junction strip is configured as a thin film hinge, whereby said first and second filter inserts can be folded flat against each other.

8. A filter arrangement according to claim 1, wherein said housing is connected to an air intake duct for an internal combustion engine.

9. A filter arrangement according to claim 1, wherein said gasket on said first filter insert and said gasket on said second filter insert form an annular gasket extending around a circumferential margin of said first and second filter inserts, and said junction strip is integrated at its extremities into said annular gasket.

* * * * *